(12) United States Patent
McCann et al.

(10) Patent No.: US 10,160,165 B2
(45) Date of Patent: Dec. 25, 2018

(54) THREE-DIMENSIONAL PRINTER WITH AN INVERTED CUTTING SURFACE AND A MOVABLE PLATFORM FOR CREATING LAYERED OBJECTS

(71) Applicant: Disney Enterprises, Inc., Burbank, CA (US)

(72) Inventors: James McCann, Pittsburgh, PA (US); Huaishu Peng, Ithaca, NY (US); Scott Hudson, Pittsburgh, PA (US); Jennifer Mankoff, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 497 days.

(21) Appl. No.: 14/679,794

(22) Filed: Apr. 6, 2015

(65) Prior Publication Data
US 2016/0288417 A1    Oct. 6, 2016

(51) Int. Cl.
*B29C 67/00* (2017.01)
*B33Y 10/00* (2015.01)
(Continued)

(52) U.S. Cl.
CPC ........ *B29C 67/0074* (2013.01); *B29C 64/141* (2017.08); *B33Y 10/00* (2014.12); *B29C 64/147* (2017.08); *B29C 64/188* (2017.08); *B29C 64/223* (2017.08); *B29C 64/232* (2017.08); *B29C 64/236* (2017.08); *B29C 64/307* (2017.08); *B29L 2009/00* (2013.01)

(58) Field of Classification Search
CPC ............ B29C 67/0051; B29C 67/0055; B29C 67/0059; B29C 67/0074; B29C 67/0081; B29C 67/0085; B29C 67/0092; B29C 64/147; B29C 64/188; B29C 64/223; B29C 64/232; B29C 64/236; B29C 64/307; B33Y 10/00; B33Y 30/00; B33Y 40/00
USPC ........................................................ 425/375
See application file for complete search history.

(56) References Cited

U.S. PATENT DOCUMENTS 4,930,382 A * 6/1990 Collins ............... A41H 3/00
                                                    33/17 R
5,368,464 A * 11/1994 Stewart .............. B26D 7/015
                                                    156/580.1
(Continued)

OTHER PUBLICATIONS

Bächer, M., Whiting, E., Bickel, B., and Sorkine-Hornung, O. "Spin-it: Optimizing moment of inertia for spinnable objects". *ACM Transactions on Graphics 33*, (Jul. 4, 2014), 96:1-96:10.
(Continued)

*Primary Examiner* — Matthew J Daniels
*Assistant Examiner* — Lawrence D. Hohenbrink, Jr.
(74) *Attorney, Agent, or Firm* — Farjami & Farjami LLP (57) ABSTRACT

There is provided a three-dimensional (3D) printer for creating a 3D object using a fabric including a cutting device, an inverted cutting surface, a securing mechanism to secure the fabric against the inverted cutting surface for cutting the fabric by the cutting device into a plurality of layers, a movable platform for receiving each of the plurality of layers, in sequence, from the inverted cutting surface after each layer is cut from the fabric, and a bonding tool to bond each layer of the plurality of fabric layers to a previously received layer as the fabric layers are sequentially received by the movable platform to create the 3D object.

20 Claims, 10 Drawing Sheets

(51) Int. Cl.
| | |
|---|---|
| *B29C 64/141* | (2017.01) |
| *B29L 9/00* | (2006.01) |
| *B29C 64/232* | (2017.01) |
| *B29C 64/307* | (2017.01) |
| *B29C 64/223* | (2017.01) |
| *B29C 64/236* | (2017.01) |
| *B29C 64/147* | (2017.01) |
| *B29C 64/188* | (2017.01) |

(56) References Cited

U.S. PATENT DOCUMENTS

| | | | |
|---|---|---|---|
| 5,730,817 A | | 3/1998 | Feygin |
| 5,883,357 A | * | 3/1999 | Newman ............ B23K 26/0853 |
| | | | 219/121.67 |
| 6,519,500 B1 | | 2/2003 | White |
| 2016/0332369 A1 | * | 11/2016 | Shah ...................... B33Y 10/00 |

OTHER PUBLICATIONS

Buechley, L., Eisenberg, M., Catchen, J., and Crockett, A. "The lilypad arduino: Using computational textiles to investigate engagement, aesthetics, and diversity in computer science education". In *CHI '08*, ACM (2008), 423-432.

Cherenack, K., Zysset, C., Kinkeldei, T., Münzenrieder, N., and Tröster, G. "Wearable electronics: Woven electronic fibers with sensing and display functions for smart textiles". *Advanced Materials* 22, 45 (2010), 5071.

Drives, F. "NinjaFlex". http://www.fennerdrives.com/ninjaflex3dprinting/ /3d/.

"Fabrisonic. Soniclayer 4000". http://fabrisonic.com.

Feygin, M., Shkolnik, A., Diamond, M. N., and Dvorskiy, E. "Laminated object Manufacturing system", 1998. U.S. Pat. No. 5,730,817.

Gellersen, H., Kortuem, G., and Schmidt, "A. Physical prototypnig with smart-its". *Pervasive Computing 04* (2004), 1536-1268.

Greenberg, S., and Fitchett, C. "Phidgets: Easy development of physical interfaces through physical widgets". In *UIST '01*, ACM (2001), 209-218.

Holleis, P., Schmidt, A., Paasovaara, S., Puikkonen, A., and Hakkilä , J. "Evaluating capacitive touch input on clothes". In *MobileHCI '08*, ACM (2008), 81-90.

Hudson, S. E. Printing teddy bears: "A technique for 3D printing of soft interactive objects". In *CHI '14*, ACM (2014), 459-468.

Hudson, S. E., and Mankoff, J. "Rapid construction of functioning physical interfaces from cardboard, thumbtacks, tin foil and masking tape". In *UIST '06*, ACM (2006), 289-298.

Ishiguro, Y., and Poupyrev, I. "3D printed interactive speakers". In *CHI '14*, ACM (2014), 1733-1742.

Lee, J. C., Avrahami, D., Hudson, S. E., Forlizzi, J., Dietz, P. H., and Leigh, D. The calder toolkit: "Wired and wireless components for rapidly prototyping interactive Devices". In *DIS '04*, ACM (2004), 167-175.

MakerBot. "Flexible filament". https://store.makerbot.com/flexible-filament.

Mcor Technonlogies. Mcor IRIS. http://mcortechnologies.com/3d-printers/iris/.

Mueller, S., Im, S., Gurevich, S., Teibrich, A., Pfisterer, L., Guimbretire, F., and Baudisch, P. "WirePrint: Fast 3D printed previews". In *UIST'14* (2014).

Mueller, S., Lopes, P., and Baudisch, P. "Interactive construction: Interactive fabrication of functional mechanical devices". In *UIST '12*, ACM (2012), 599-606.

Mueller, S., Mohr, T., Guenther, K., Frohnhofen, J., and Baudisch, P. "faBrickation: Fast 3D printing of functional objects by integrating construction kit building blocks". In *CHI EA '14*, ACM (2014), 187-188.

Ngai, G., Chan, S. C., Cheung, J. C., and Lau, W. W. The teeboard: An education-friendly construction platform for e-textiles and wearable computing. In *CHI '09*, ACM (2009), 249-258.

Objet. Connex multi-material printer. http://www.stratasys.com/3d-printers/design-series/objet-connex500.

Perner-Wilson, H., and Buechley, L. "Making textile sensors from scratch". In *TEI '10*, ACM (2010), 349-352.

Pfeifer, R., Lungarella, M., and Iida, F. "The challenges ahead for bio-inspired 'soft' robotics". *Communications of the ACM* 55,11 (Nov. 2012), 76-87.

Pr'evost, R., Whiting, E., Lefebvre, S., and Sorkine-Hornung, O. "Make it stand: Balancing shapes for 3D fabrication". *ACM Trans. Graph. 32*, (Jul. 4, 2013), 81:1-81:10.

Rosner, D., and Ryokai, K. "Weaving memories into handcrafted artifacts with spyn". In *CHI EA '08*, ACM (2008), 2331-2336.

Savage, V., Chang, C., and Hartmann, B. Sauron: embedded single-camera sensing of printed physical user interfaces. In *The 26th Annual ACM Symposium on User Interface Software and Technology, UIST'13, St. Andrews, United Kingdom*, Oct. 8-11, 2013 (2013), 447-456.

Savage, V., Zhang, X., and Hartmann, B. Midas: "Fabricating custom capacitive touch sensors to prototype interactive objects". In *UIST '12*, ACM (2012), 579-588.

Shilkrot, R., Maes, P., and Zoran, A. "Physical rendering with a digital airbrush". In *ACM SIGGRAPH 2014 Emerging Technologies*, SIGGRAPH '14, ACM (New York, NY, USA, 2014), 19:1-19:1.

Slyper, R., Poupyrev, I., and Hodgins, J. "Sensing through structure: Designing soft silicone sensors". In *Proceedings of the Fifth International Conference on Tangible, Embedded, and Embodied Interaction*, ACM (2011), 213-220.

Song, H., Guimbreti'ere, F., Hu, C., and Lipson, H. "Modelcraft: Capturing freehand annotations and edits on physical 3d models". In *Proceedings of the 19th Annual ACM Symposium on User Interface Software and Technology*, UIST '06, ACM (New York, NY, USA, 2006), 13-22.

Sugiura, Y., Lee, C., Ogata, M., Withana, A., Makino, Y., Sakamoto, D., Inami, M., and Igarashi, T. "Pinoky: A ring that animates your plush toys". In *CHI '12*, ACM (2012), 725-734.

Truong, K. N., Richter, H., Hayes, G. R., and Abowd, G. D. "Devices for sharing thoughts and affection at a distance". In *CHI EA '04*, ACM (2004), 1203-1206.

White, D. "Ultrasonic object consolidation", 2003. U.S. Pat. No. 6,519,500.

Willis, K., Brockmeyer, E., Hudson, S., and Poupyrev, I. "Printed optics: 3D printing of embedded optical elements for interactive devices". In *UIST '12*, ACM (2012), 589-598.

Yoshikai, T., Fukushima, H., Hayashi, M., and Inaba, M. "Development of soft stretchable knit sensor for humanoids' whole-body tactile sensibility" (2009). 624-631.

Zoran, A., Shilkrot, R., and Paradiso, J. Human-computer interaction for hybrid carving. In *Proceedings of the 26th Annual ACM Symposium on User Interface Software and Technology*, UIST '13, ACM (New York, NY, USA, 2013), 433-440.

* cited by examiner

THREE-DIMENSIONAL PRINTER WITH AN INVERTED CUTTING SURFACE AND A MOVABLE PLATFORM FOR CREATING LAYERED OBJECTS

BACKGROUND

Three-dimensional (3D) printers allow users to manufacture custom objects on demand. Typically, 3D printers work by following a computer's digital instructions to print an object using materials such as plastic, ceramics and metal. The printing process involves building up an object one layer at a time until the printing is complete. Today, more and more 3D printers are being used at homes, and commercial suppliers and retailers to create custom objects.

SUMMARY

There is provided a 3D printer with an inverted cutting surface and a movable platform for creating layered objects, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1A:
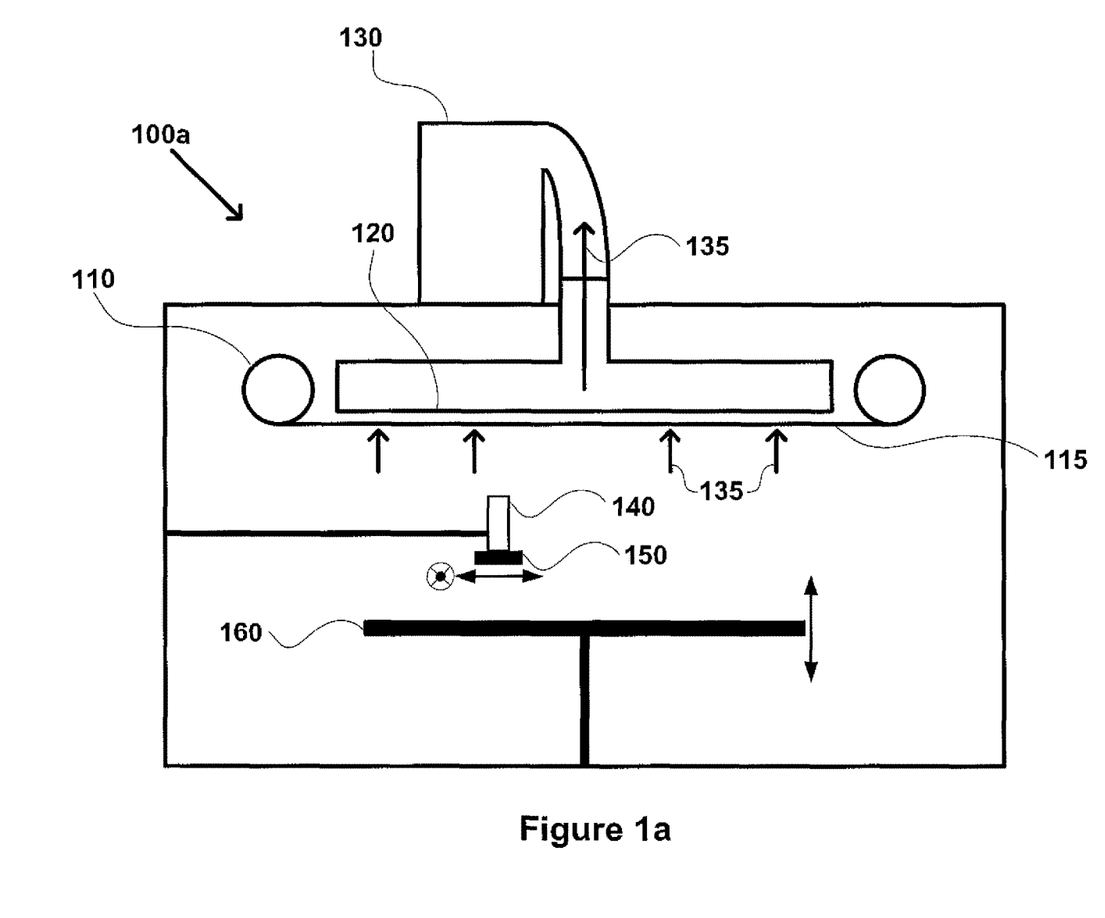
FIG. 1a shows a diagram of an exemplary 3D printer with an inverted cutting surface and a movable platform, according to one implementation of the present disclosure.

FIG. 1a shows a diagram of an exemplary 3D printer having an inverted cutting surface and a movable platform, according to one implementation of the present disclosure. As shown in FIG. 1a, 3D printer 100a includes fabric roll 110, fabric 115, inverted cutting surface 120, vacuum 130, as a securing mechanism, cutting device 140, bonding tool 150, and movable platform 160. 3D printer 100a may be used to print multi-layered 3D objects using a plurality of layers of fabric 115. As described in more detail below, the 3D object may be printed one layer at a time, with each layer being stacked sequentially on movable platform 160 after the layer is cut, and then bonded to a previously stacked layer. Layers of the 3D object being printed may be cut on inverted cutting surface 120, and assembled by sequentially stacking and bonding the layers on movable platform 160, as discussed in greater detail below.

Although FIG. 1a shows 3D printer 100a with fabric roll 110, some implementations may have alternate arrangements for storage of fabric 115. Some implementations may include a mechanism to stack fabric 115, roll fabric 115, and provide a continuous feed of fabric 115. Some implementations may not include a mechanism for storing fabric 115. Fabric may vary from object to object. Some 3D printed fabric objects may benefit from different characteristics of fabric 115. For example, some objects may include a layer that has a draping effect, like a doll that includes a layer that drapes to form the body of the doll, or a doll that includes a layer that drapes to form an item of clothing, such as a shirt or a dress for the doll. Some implementations may benefit from a fabric that is stiffer and may be used to form structural elements of the printed object, such as the ears of a rabbit when the 3D object being printed is a rabbit that does not have floppy ears.

Fabric 115 may be chosen from any type of fabric, and may be selected for desirable properties of the fabric. Fabric 115 may include fabric made from natural fibers, such as wool, cotton, silk, linen, or other natural fibers. Fabric 115 may include nylon, polyester, acrylic, rayon, spandex, and other synthetic or semi-synthetic fibers. Fabric 115 may include felt, velvet, fleece, and other fabrics that can be made from natural, semi-synthetic, synthetic fibers, or a blend thereof. Still other 3D printed objects may benefit from including more than one fabric. Some implementations may utilize more than one fabric 115. In some implementations, the 3D object being printed may include a layer of conductive fabric.

In some implementations, a 3D printer may include inverted cutting surface 120. Each layer of the plurality of layers used to create the 3D object being printed may be cut from fabric 115 using inverted cutting surface 120 to support the fabric. In some implementations, inverted cutting surface 120 may be a solid surface typically used for cutting, such as plastic, wood, metal, or other typical cutting surface. However, some implementations may include inverted cutting surface 120 that is air permeable, such as a screen or mesh. For example, when a securing mechanism used to secure fabric against inverted cutting surface 120 includes the use of airflow 135, such as vacuum 130, it may be desirable to allow air to flow through inverted cutting surface 120. In some implementations, inverted cutting surface 120 may be formed using a wire mesh or other material that will provide sufficient support against which secure fabric 115 while fabric 115 is cut by cutting device 140, and at the same time, allow airflow to pass through fabric 115 and inverted cutting surface 120. In such an implementation, airflow 135 may provide exhaust for smoke and fumes that may be caused by the cutting process.

In some implementations, a securing mechanism may include any way that fabric 115 can be secured against inverted cutting surface 120 such that layers can be cut from fabric 115. In particular, 3D printer 100a may include vacuum 130 as a securing mechanism to secure fabric 115 against inverted cutting surface 120. Without a securing mechanism, gravity would cause fabric 115 to fall away from inverted cutting surface 120. FIG. 1a depicts vacuum 130 arranged to draw air through fabric 115 towards inverted cutting surface 120. In such an implementation, inverted cutting surface 120 may be air permeable, allowing airflow 135 to flow through fabric 115 and through inverted cutting surface 120. When airflow 135 is used as securing mechanism, fabric 115 may be secured against inverted cutting surface 120 by the air pressure differential across fabric 115. As such, vacuum 130 may be disposed on the side of inverted cutting surface 120 pulling air through fabric 115 and inverted cutting surface 120.

Figure 1B:
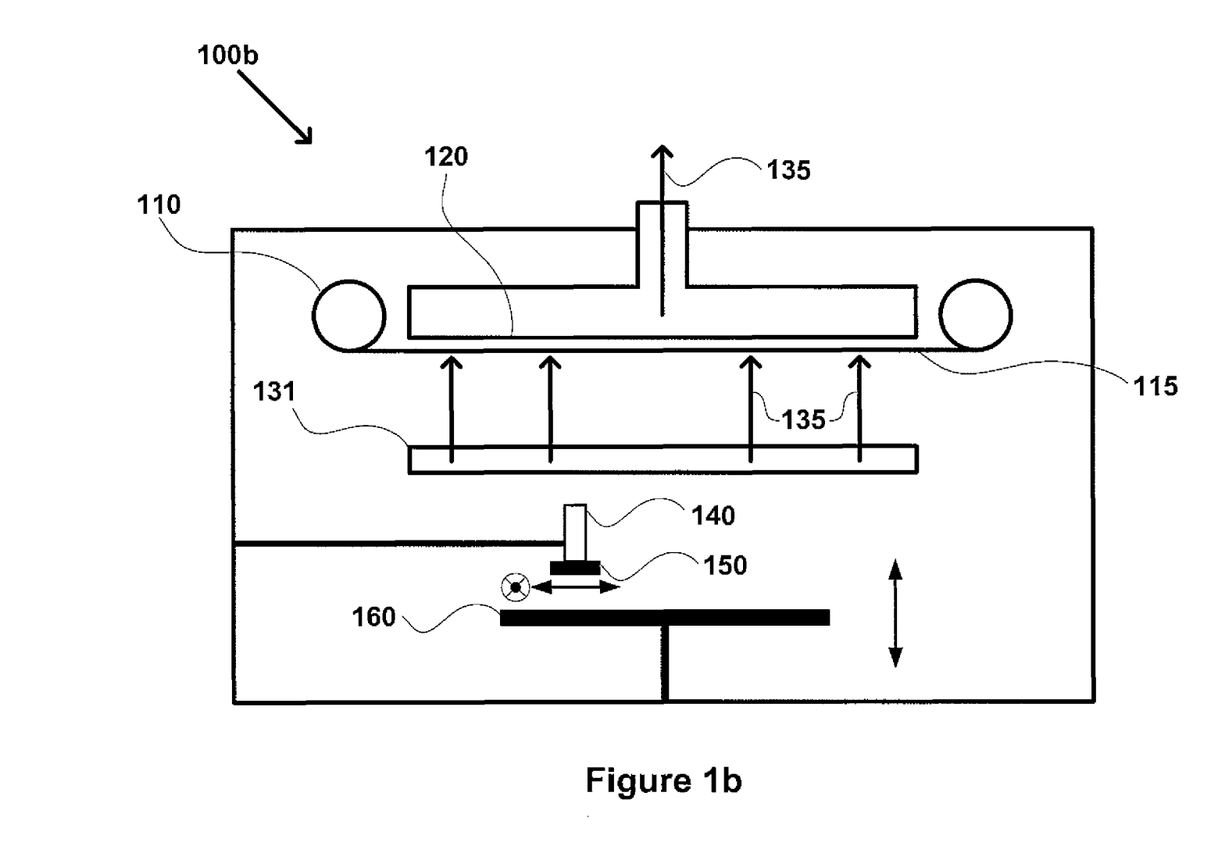
FIG. 1b shows a diagram of an exemplary 3D printer with an inverted cutting surface and a movable platform, according to one implementation of the present disclosure.

FIG. 1b shows a diagram of an exemplary 3D printer, according to one implementation of the present disclosure. 3D printer 100b includes many of the same components as 3D printer 100a, as indicated by the consistent labels on each component. However, 3D printer 100b uses fan 131 as a securing mechanism to secure fabric 115 to inverted cutting surface 120. In some implementations, the securing mechanism may be fan 131 disposed on the same side of inverted cutting surface 120 as fabric 115, blowing air towards fabric 115.

Figure 1C:
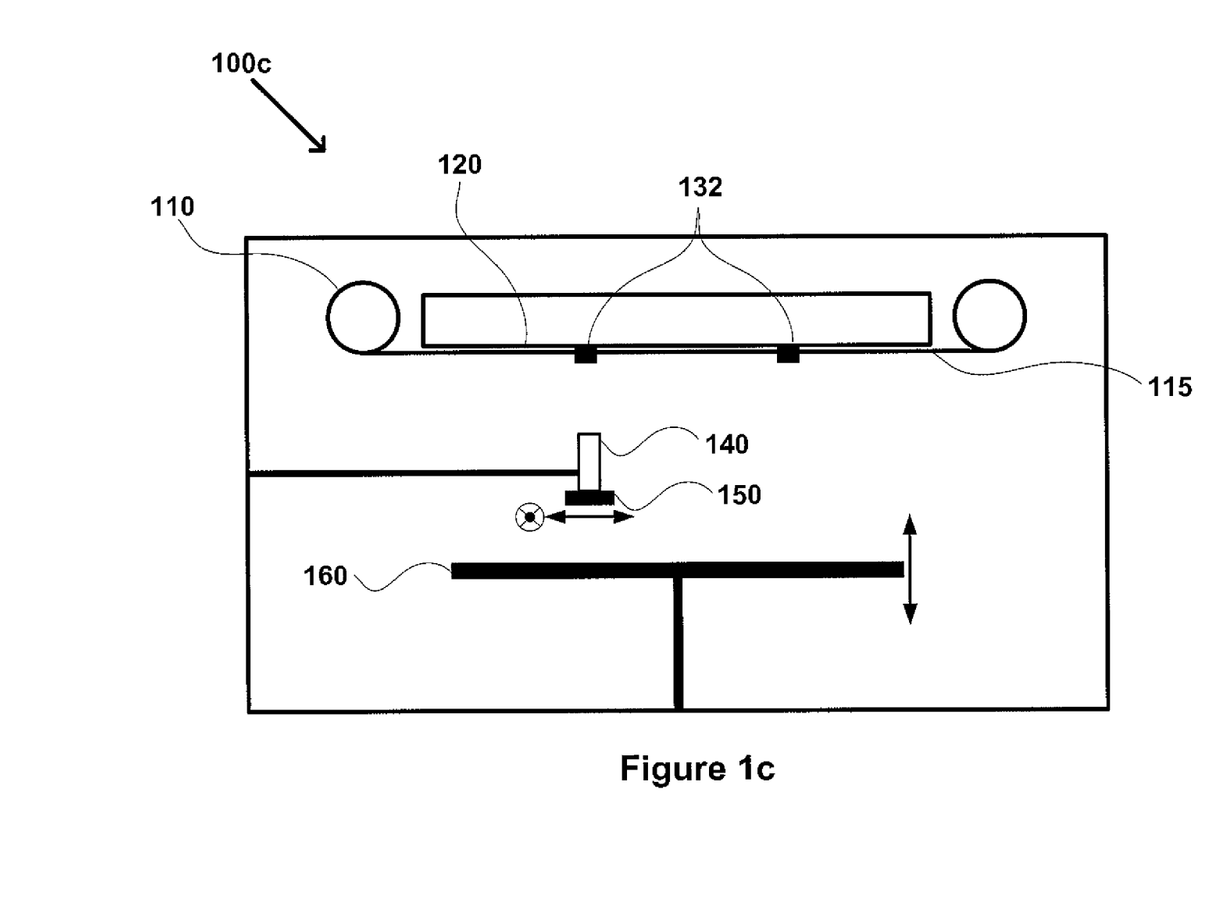
FIG. 1c shows a diagram of an exemplary 3D printer with an inverted cutting surface and a movable platform, according to one implementation of the present disclosure.

FIG. 1c shows a diagram of an exemplary 3D printer, according to one implementation of the present disclosure. 3D printer 100c includes many of the same components as 3D printer 100a, as indicated by the consistent labels on each component. However, 3D printer 100c shows using clips 132 as a securing mechanism to secure fabric 115 to inverted cutting surface 120. In some implementations, other securing mechanisms may be used to secure fabric 115 in place against inverted cutting surface 120. In some implementations, the securing mechanism may include clips or other mechanisms that use pressure or compression to secure fabric 115 against inverted cutting surface 120. In some implementations, the securing mechanism may include pins, tacks, nails, or other mechanisms that penetrate through fabric 115 to secure fabric 115 against inverted cutting surface 120.

Figure 1D:
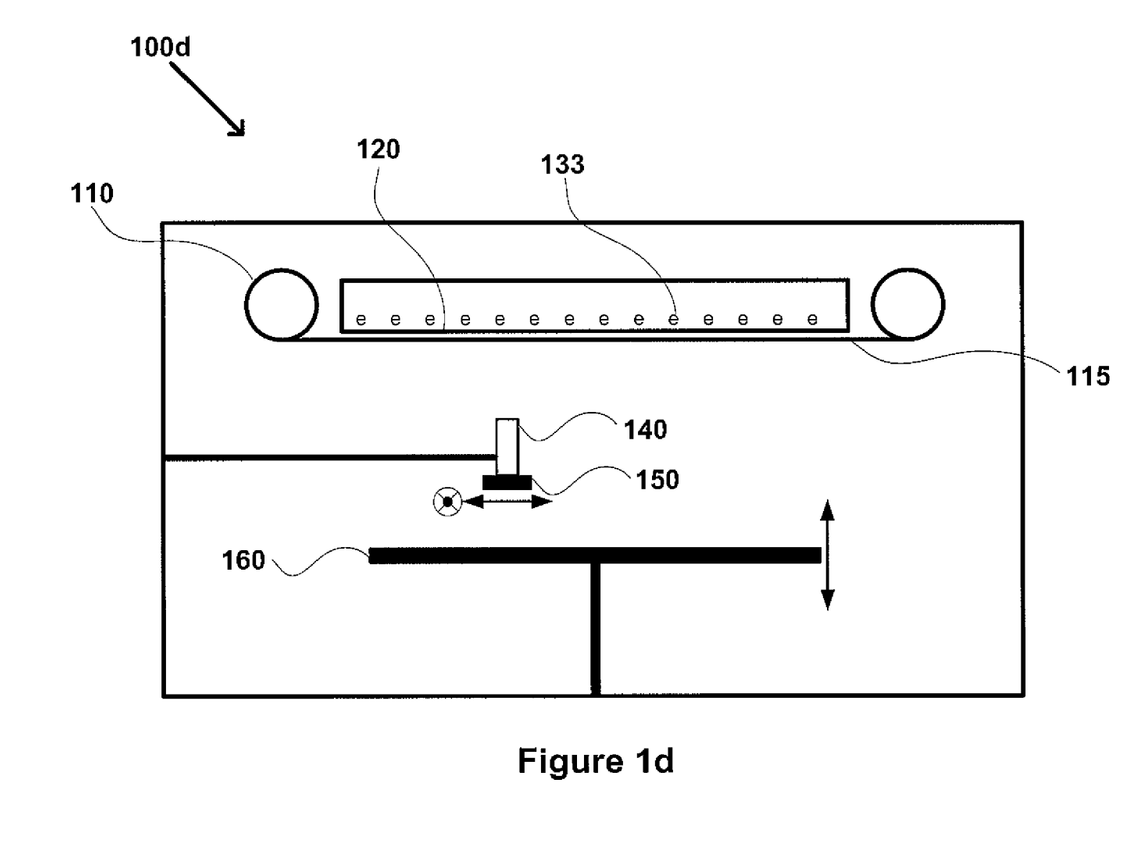
FIG. 1d shows a diagram of an exemplary 3D printer with an inverted cutting surface and a movable platform, according to one implementation of the present disclosure.

FIG. 1d shows a diagram of an exemplary 3D printer, according to one implementation of the present disclosure. 3D printer 100d includes many of the same components as 3D printer 100a, as indicated by the consistent labels on each component. However, 3D printer 100d uses electric charge 133 as a securing mechanism to secure fabric 115 to inverted cutting surface 120. In some implementations, the securing mechanism may include various implementations of electromagnetism, such as electric charge, static electricity, or magnetism. FIG. 1d depicts an implementation in which the securing mechanism uses electric charge 133 created by electrons (e) to secure fabric 115 to inverted cutting surface 120. In some implementations, the securing mechanism may include tension of fabric 115.

Cutting device 140 may be used to cut fabric 115 into a plurality of layers, which, in turn, are used to create the 3D object being printed. As shown in FIGS. 1a-1d, inverted cutting surface 120 is located above fabric 115, which is located above cutting device 140. Accordingly, cutting device 140 may be utilized to cut fabric 115, which is above cutting device 140. Cutting device 140 may include a blade, such as a knife or a razor blade. In some implementations, cutting device 140 may include a heating element. In some implementations, cutting device 140 may include a water jet or a laser. In some implementations, cutting device 140 can be an infrared laser, a near-infrared laser, a visible light laser, or other light cutting device. In some implementations, cutting device 140 may be a water-cooled 40-Watt $CO_2$ laser tube of the type commonly used in commercial laser cutters to generate a high power infrared laser beam.

To create the 3D object, layers of the 3D object being printed may be bonded to adjacent layers using bonding tool 150. Bonding tool 150 may include a heating element. Bonding tool 150, including the heating element, may be used to activate an adhesive to bond adjacent layers of the 3D object being printed. In some implementations, bonding tool 150 may include a steam nozzle, an iron, or other mechanisms to transfer heat energy for activating an adhesive. In some implementations, an adhesive that is activated by an activation method other than heat, such as radio waves, microwaves, x-rays, may perform the bonding. As such, bonding tool 150 may include a radio device, a microwave device, an x-ray device, or any device that may activate a bonding material used to bond layers.

Some implementations may include movable platform 160, which may move relative to inverted cutting surface 120. Movable platform 160 may move to allow cutting device 140 to make perimeter cuts and border cuts in fabric 115. Once cutting device 140 has completed making cuts, movable platform 160 may move to receive the layer that has been cut from fabric 115. Movable platform 160 may sequentially receive each layer that is cut from fabric 115. In this manner, the 3D object being printed may be formed by a plurality of layers sequentially received by movable platform 160.

Figure 2:
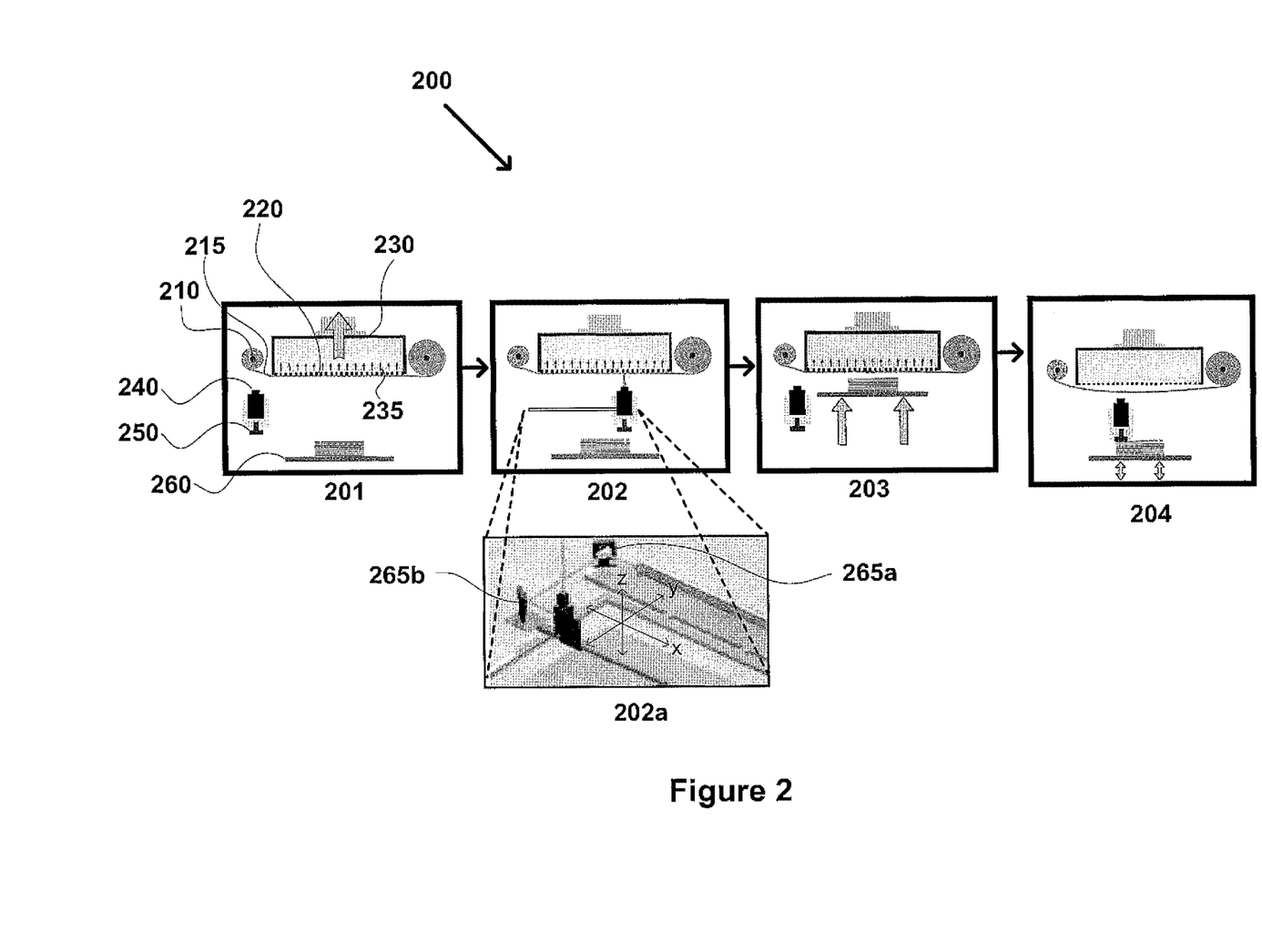
FIG. 2 shows an exemplary flow diagram of a 3D printing process, according to one implementation of the present disclosure.
Figure 3:
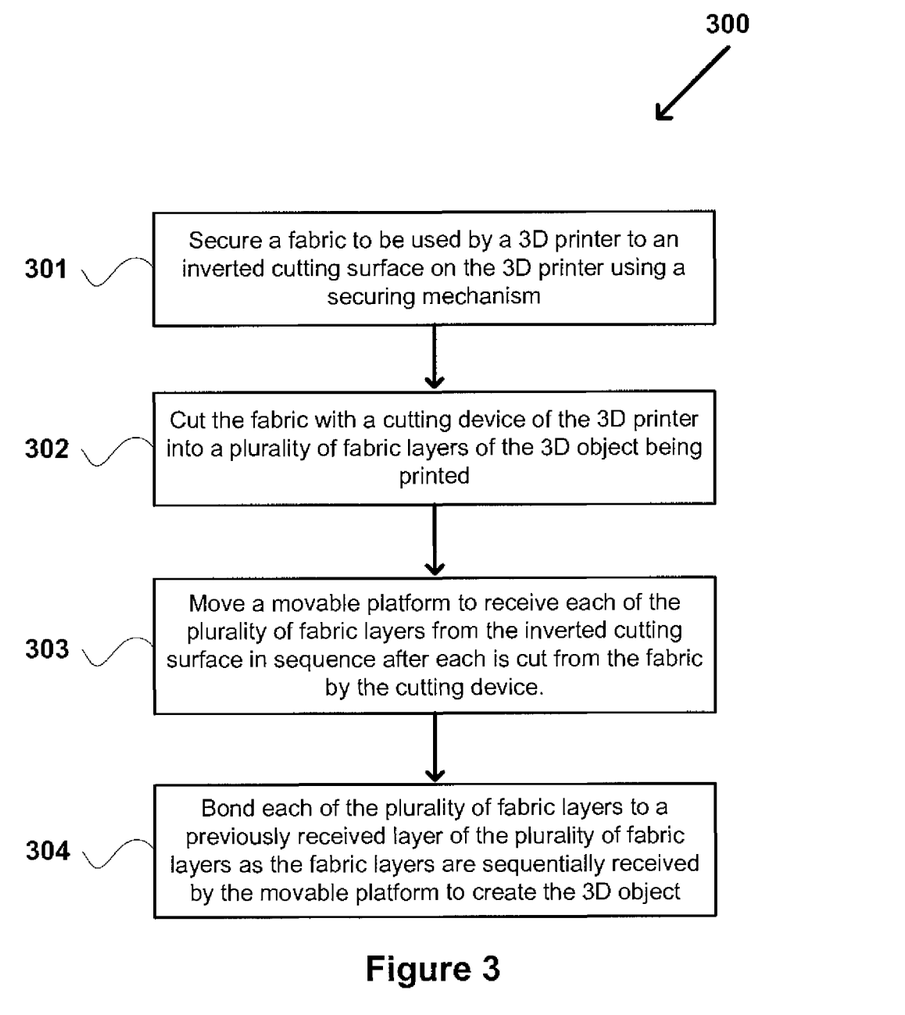
FIG. 3 shows a flowchart illustrating a method of printing a 3D object, according to one implementation of the present disclosure.

FIG. 2 shows exemplary flow diagram 200 of a printing process, according to one implementation of the present disclosure. FIG. 3 shows flowchart 300 illustrating a method of printing a 3D object, according to one implementation of the present disclosure, which is described in conjunction with FIG. 2.

At 301, here vacuum table 230 acts as a securing mechanism to secure fabric 215 against inverted cutting surface 220.

At 302, cutting device 240 cuts a layer from fabric 215. To cut a layer from fabric 215, cutting device 240 may be movable in a first dimension and a second dimension, corresponding to an (X, Y) plane. In some implementations, the first dimension and second dimension may be parallel or substantially parallel to inverted cutting surface 220. In some implementations, the first dimension and the second dimension may be within about 0°, 1°, 2°, 3°, 4°, 5°, 10°, 15°, or any combination of the enumerated angles up to about 15°, of variance from parallel to inverted cutting surface 220.

Cutting device 240 may be capable of cutting at any (X, Y) position corresponding to inverted cutting surface 220. As shown in 202a, a laser tube is arranged along an edge of 3D printer 200. To project the laser to cutting device 240, the beam travels along an edge of the printer in a first dimension by a fixed amount. Moveable mirrors 265a and 265b may be used to control the distance the laser beam travels in the first dimension (along the edge of 3D printer 200) and next in a second dimension (inwards into the printing area). Finally, the beam travels through the laser head, which contains another mirror and a focusing lens, and finally up by a fixed amount in a third dimension, corresponding to a Z dimension, to the fabric. Movable mirrors 265a and 265b may be silicon coated gold reflective mirrors. Note that the second mirror 265b and laser head may be attached to a movable gantry which moves in the first dimension. In addition the laser head can move in the second dimension. Together, these movements can cover the entire (X, Y) cutting plane. Laser intensity may be relatively unaffected when the laser head moves, ensuring a continuous cutting beam without needing to move the large laser tube.

The process of cutting a layer from fabric 215 involves cutting the perimeter of a bounding shape, and cutting the border of the particular 2D layer being cut. The bounding shape may be the same for each layer of the plurality of layers. In some implementations, the perimeter of the bounding shape may be cut at least two times to ensure that the layer, including the bounding shape, completely separates from fabric 215 and may be easily released onto movable platform 260. To ensure the stability of potentially small pieces that are part of the 2D contour cut by the border of the 2D layer, cutting device 240 may be set to cut almost but not entirely through fabric 215 during the border cut. This ensures a few points with weak connection between the 3D object being printed and the bounding shape. This method ensures that even if border cut creates a piece that is smaller than the grid size of air permeable inverted cutting surface 220, the cut piece will not fall prematurely or be sucked into vacuum table 230 before movable platform 260 arrives. These border cuts are easy to 'finish' during the manual support-removal process simply by tearing away the excess support material of the bounding shape.

At 303, movable platform 260 may move to receive the layer that was cut by cutting device 250 from fabric 215. Movable platform 260 may be movable in a third dimension. In some implementations, the third dimension may be perpendicular or substantially perpendicular to inverted cutting surface 220. In some implementations, movable platform 260 may be within about 0°, 1°, 2°, 3°, 4°, 5°, 10°, 15°, or any combination of the enumerated angles up to about 15°, of variance from perpendicular to inverted cutting surface 220.

At 304, bonding tool 250 may be used to bond the just-received 2D layer of the 3D object being printed to a layer previously received by movable platform 260. Bonding tool 250, similar to cutting device 240, may be movable in the first dimension and the second dimension, enabling bonding tool 250 to be positioned at points corresponding to any (X, Y) position of the fabric layer received by movable platform 260.

Figure 4A:
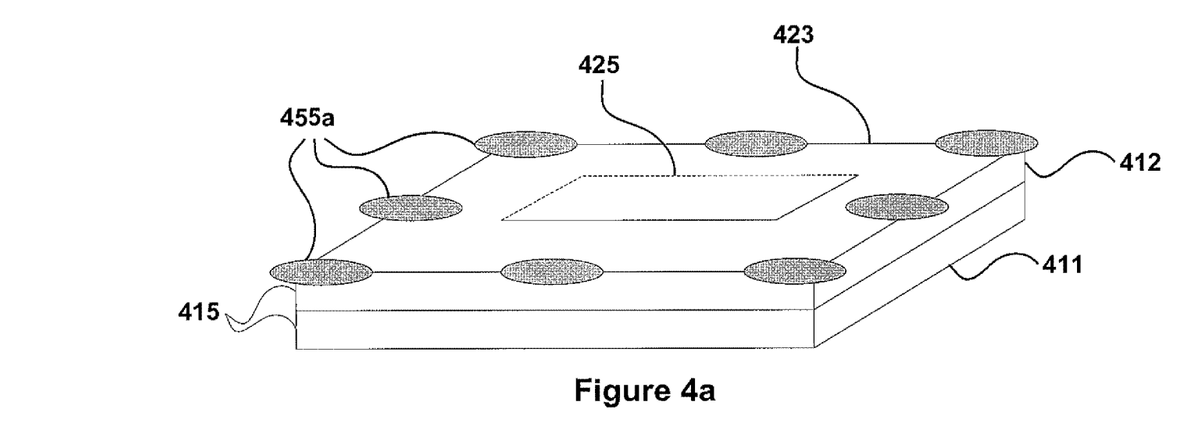
FIG. 4a shows a diagram of a step in a bonding process of 3D printing, according to one implementation of the present disclosure.

FIG. 4a shows a diagram of a step in a bonding process of 3D printing, according to one implementation of the present disclosure. In some implementations, a fusible adhesive may be incorporated between fabric layers 411 and 412 without being previously adhered to either layer 411 or layer 412. Bonding tool 150, in combination with movable platform 160, may apply heat and pressure to activate the fusible adhesive to bond layer 411 to layer 412. The bonding process begins by bonding points 455a on the perimeter of the bounding shape. In some implementations, the perimeter of the layer may be a rectangle, and the points that are bonded correspond to the corners of the rectangle and the midpoints of each side of the rectangle, as depicted in FIG. 4a.

Figure 4B:
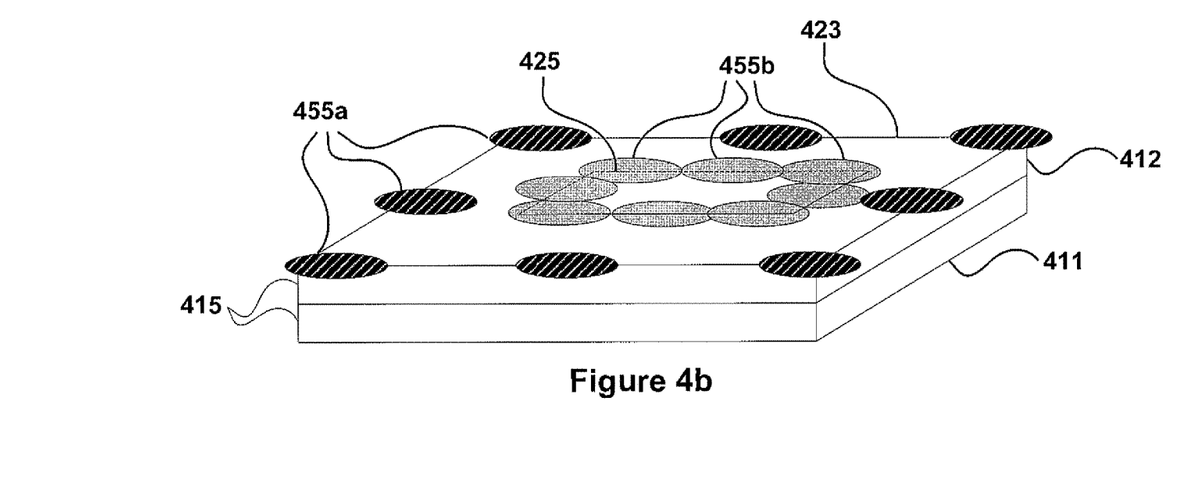
FIG. 4b shows a diagram of an additional step in a bonding process of 3D printing, according to one implementation of the present disclosure.

FIG. 4b shows a diagram of an additional step in a bonding process of 3D printing, according to one implementation of the present disclosure. After points 455a on perimeter cut 425 of the bounding shape are bonded using bonding tool 160, points 455b, corresponding to points along border cut 423 are bonded using bonding tool 160. FIG. 4b includes points 455a to illustrate that those points were previously bonded, as described in relation to FIG. 4a.

Figure 5A:
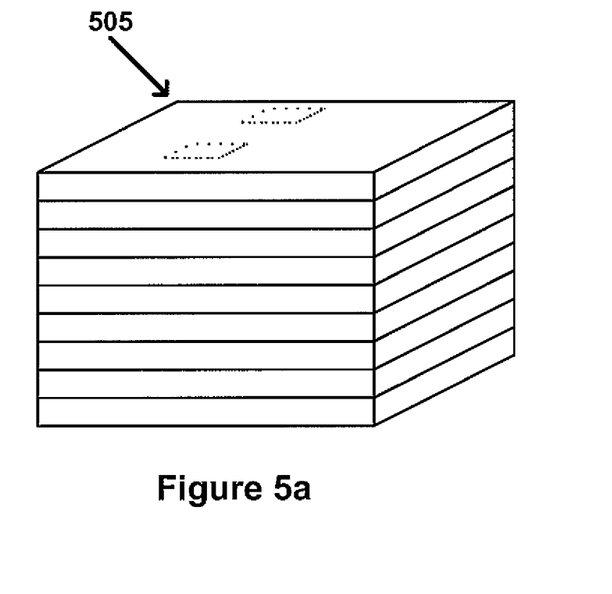
FIG. 5a presents a layered 3D object having a surrounding support material and being printed using a 3D printing process, according to one implementation of the present disclosure.
Figure 5B:
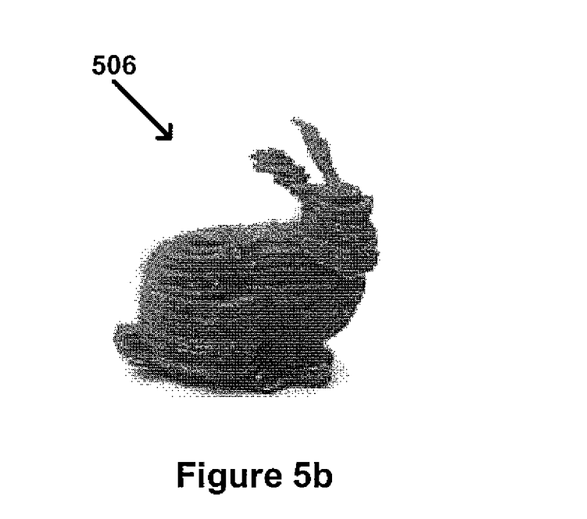
FIG. 5b presents the layered 3D object of FIG. 5a after removal of the surrounding support material, according to one implementation of the present disclosure.

FIG. 5a shows the completed 3D printed object enclosed within support material provided by the bounding shape, according to one implementation of the present disclosure. FIG. 5b presents the layered 3D object of FIG. 5a after removal of the surrounding support material. FIG. 5b shows a completed printed object, Stanford bunny model 506, after removal of support material, according to one implementation of the present disclosure. Stanford bunny model 506, may be printed with standard printing routine introduced above and consist of 32 layers of acrylic felt fabric resulting in a 64 mm high final product. The printing process disclosed herein may preserve most of the details in the underlying 3D digital model, like the nose and ears, and may include relatively complex overhanging shapes, such as in the ears of Stanford bunny model 506. Because of the cutting strategy used, fabric from the bounding shape of the previous layer serves as support for overhangs, including very small and sharply overhung features such as the ears of Stanford bunny model 506.

Figure 6:
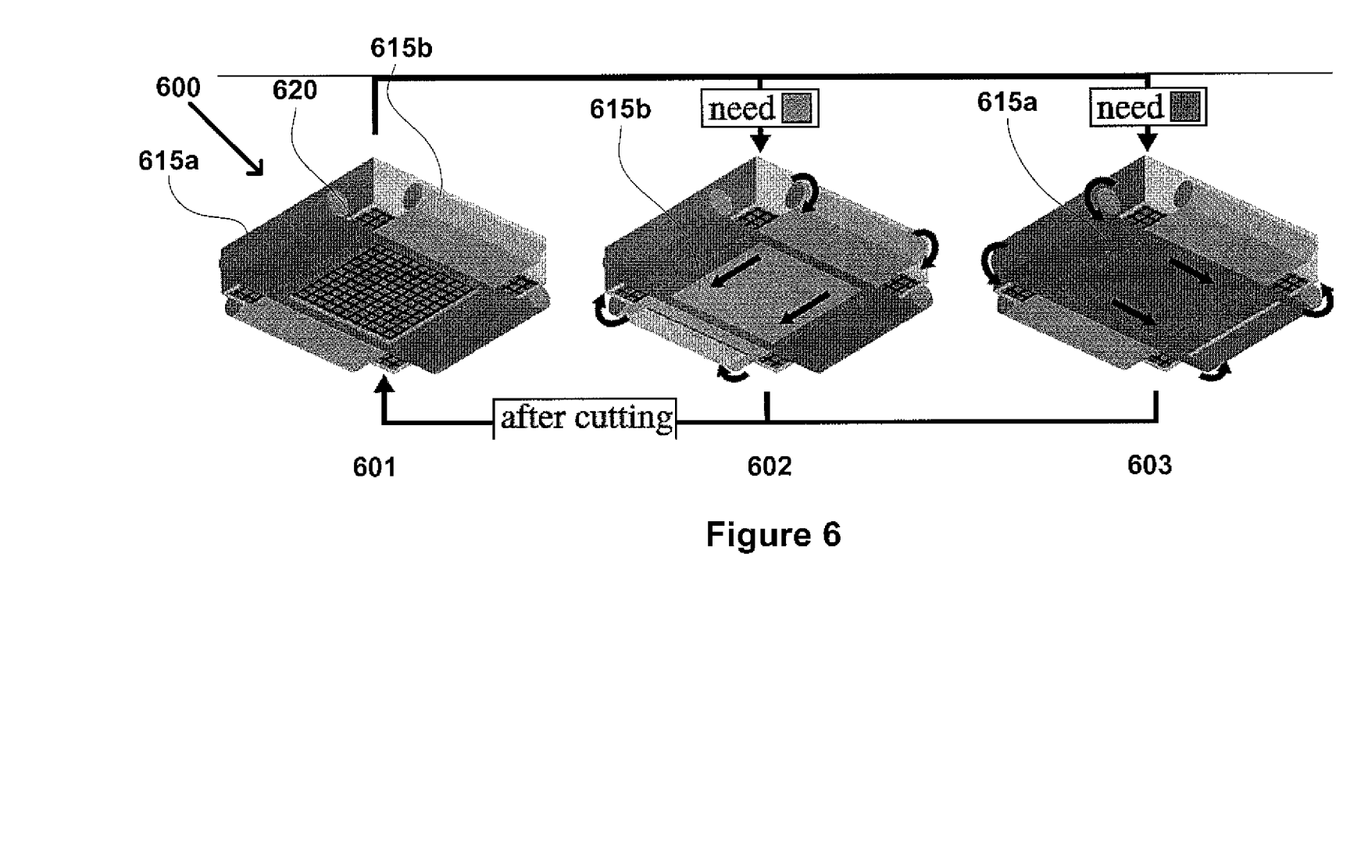
FIG. 6 shows a diagram of a 3D printer using two fabrics for printing a 3D object, according to one implementation of the present disclosure.

FIG. 6 shows a diagram of a 3D printer including two different fabrics used to print a 3D object, according to one implementation of the present disclosure. As previously mentioned, a 3D printer can be configured to print a 3D object having a plurality of layers of fabric, wherein each layer includes one type of fabric, and different layers of the plurality of layers may including different fabrics. Separate layers of material 615 may be used to create a 3D printed object. Before printing, a "window" the size of the bounding shape may be cut in both materials, corresponding to the perimeter cut of each layer. Then, during printing, only the material to be used in the next layer may be advanced onto the cutting area of inverted cutting surface 620. When the layer is received by movable platform 160, the perimeter of the bounding shape becomes a window in the material, and the process can be repeated, as illustrated in FIG. 6. At 601, 3D printer 600 is ready to begin the process to cut a subsequent fabric layer from either of fabric 615a and fabric 615b. If the next layer of the 3D object being printed requires fabric 615b, fabric 615b is advanced to be cut by cutting device 140, as depicted at 601. However, if the next layer of the 3D being printed requires fabric 615a, fabric 615a is advanced to be cut by cutting device 140, as depicted at 602. As can be seen in FIG. 6, because of the cutting process, specifically that the cutting process cuts not only the border of the 2D layer but also the perimeter of the bounding shape, the cutting area of inverted cutting surface 620 is left clear for cutting the next layer from either fabric 615a or fabric 615b, whichever fabric is needed.

Figure 7:
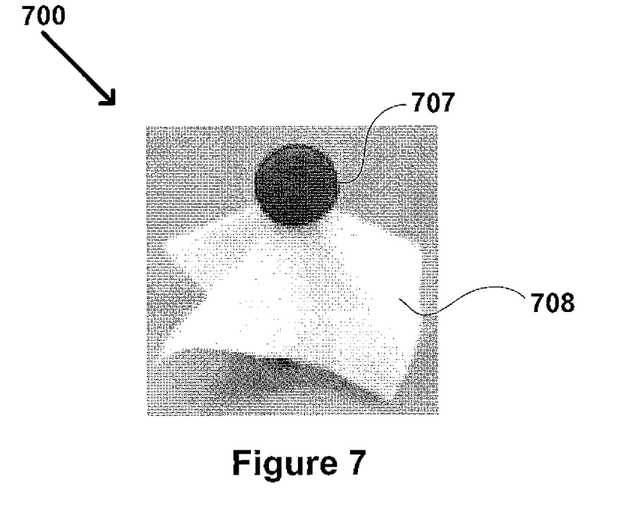
FIG. 7 shows a layered 3D object printed with a draping layer, according to one implementation of the present disclosure.

FIG. 7 shows a layered 3D object printed with a draping layer, according to one implementation of the present disclosure. FIG. 7 shows doll 700 including doll head 707 and draping layer 708. Doll 700 is a traditional Japanese sunny doll (named teru teru bozu) that is usually made with paper or cloth with a round top as the head and draping cloth as the body. An exemplary teru teru bozu doll may be printed with the head 707 being printed in red felt and draping layer 708, forming the body, in white felt. Though printed as a flat square, draping layer 707 may be used to form a body, as shown in FIG. 7.

In addition to draping, other functional fabrics may be incorporated. For example, a 3D object may be printed which may include a layer of a conductive fabric to create functional objects such as custom printed capacitive touch sensors. Arbitrarily cut shapes within a layer may also be used to create conductive fabric "wiring" between electronic components—the rough equivalent of printed circuit boards, but made entirely from, and embedded inside of, soft fabric. To create functional printed circuits, shorts must be avoided. One approach to accomplishing this is to pause the print and manually remove segments of extra conductive material. It may also be possible to cut conductive traces in a purely automatic fashion without the need to pause the print. This may be accomplished by increasing the width, or kerf, of the laser cut to create a sufficient gap between the intended conductive trace and the material around it. Such small amounts of inner material can be removed by increasing laser power, slowing down movement of the cutting beam, or cutting the path multiple times with a small offset.

The term two-dimensional (2D), as used herein, refers to a cross-section of a 3D object that is being printed. Each 2D layer may not be literally 2D, but the thickness of the 2D layer may be substantially less that the total height of the finished 3D object, so each layer may be considered a 2D cross section of the 3D object being printed.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A three-dimensional (3D) printer system for creating a 3D object using a fabric, the 3D printer system comprising:
   a cutter;
   an inverted cutting surface, wherein the 3D printer system is configured to secure the fabric against the inverted cutting surface for cutting the fabric by the cutter into a plurality of fabric layers; and
   a movable platform moving to sequentially receive each of the plurality of fabric layers from the inverted cutting surface after each is cut from the fabric by the cutter, wherein the 3D printer system is configured to bond, on the movable platform, each of the plurality of fabric layers as sequentially received by the movable platform to a previously received layer of the plurality of fabric layers received by the movable platform to create the 3D object;
   wherein the cutter is moveable in a plane having an angle of variance from parallel to the inverted cutting surface, and wherein the angle of variance is greater than zero.

2. The system of claim 1, wherein the cutter is movable in a first dimension and a second dimension, wherein the first dimension and the second dimension are substantially parallel to the inverted cutting surface, and the movable platform is movable in a third dimension, wherein the third dimension is substantially perpendicular to the inverted cutting surface.

3. The system of claim 1, wherein the bonding occurs in a first dimension and a second dimension, wherein the first dimension and the second dimension are substantially parallel to the inverted cutting surface, and the movable platform is movable in a third dimension, wherein the third dimension is substantially perpendicular to the inverted cutting surface.

4. The system of claim 1, wherein the cutter is located and movable between the inverted cutting surface and the movable platform.

5. The system of claim 1, wherein the cutter is one of a laser, a knife, and a water jet.

6. The system of claim 1, wherein the inverted cutting surface is an air permeable surface.

7. The system of claim 1, wherein the 3D printer system applies an air pressure differential across the fabric to secure the fabric against the inverted cutting surface.

8. The system of claim 1, wherein the 3D printer system uses one of static electricity and magnetism to secure the fabric against the inverted cutting surface.

9. The system of claim 1, wherein the 3D printer system uses a heater to bond each of the plurality of fabric layers to the previously received layer.

10. The system of claim 1, wherein the plane has an angle of variance of up to 15° from parallel to the inverted cutting surface.

11. A method for use by a three-dimensional (3D) printer to create a 3D object using a fabric, the method comprising:
    securing the fabric against an inverted cutting surface of the 3D printer using a securing mechanism of the 3D printer;
    cutting the fabric using a cutter into a plurality of fabric layers, after the securing of the fabric against the inverted cutting surface;
    moving a movable platform to sequentially receive each of the plurality of fabric layers from the inverted cutting surface after each is cut from the fabric by the cutter; and
    bonding, on the movable platform, each of the plurality of fabric layers as sequentially received by the movable platform to a previously received layer of the plurality of fabric layers received by the movable platform to create the 3D object;
    wherein the cutter is moveable in a plane having an angle of variance from parallel to the inverted cutting surface, and wherein the angle of variance is greater than zero.

12. The method of claim 11 further comprising:
    moving the cutter in a first dimension and the second dimension, wherein the first dimension and second dimension are substantially parallel to the inverted cutting surface; and
    moving the movable platform in a third dimension, wherein the third dimension is substantially perpendicular to the inverted cutting surface.

13. The method of claim 11, wherein the bonding occurs in a first dimension and the second dimension, wherein the first dimension and second dimension are substantially parallel to the inverted cutting surface, and wherein the movable platform moves in a third dimension, wherein the third dimension is substantially perpendicular to the inverted cutting surface.

14. The method of claim 11, wherein the cutter is located and moves between the inverted cutting surface and the movable platform.

15. The method of claim 11, wherein the cutter is one of a laser, a knife, and a water jet.

16. The method of claim 11, wherein the inverted cutting surface is an air permeable surface.

17. The method of claim 11, wherein the securing applies an air pressure differential across the fabric.

18. The method of claim 11, wherein the securing uses one of static electricity and magnetism.

19. The method of claim 11, wherein the bonding uses a heater.

20. The method of claim 11, wherein the plane has an angle of variance of up to 15° from parallel to the inverted cutting surface.

* * * * *